Sept. 6, 1960     I. BERGER     2,951,522
TRACTION DEVICE FOR VEHICLE WHEELS
Filed March 25, 1958
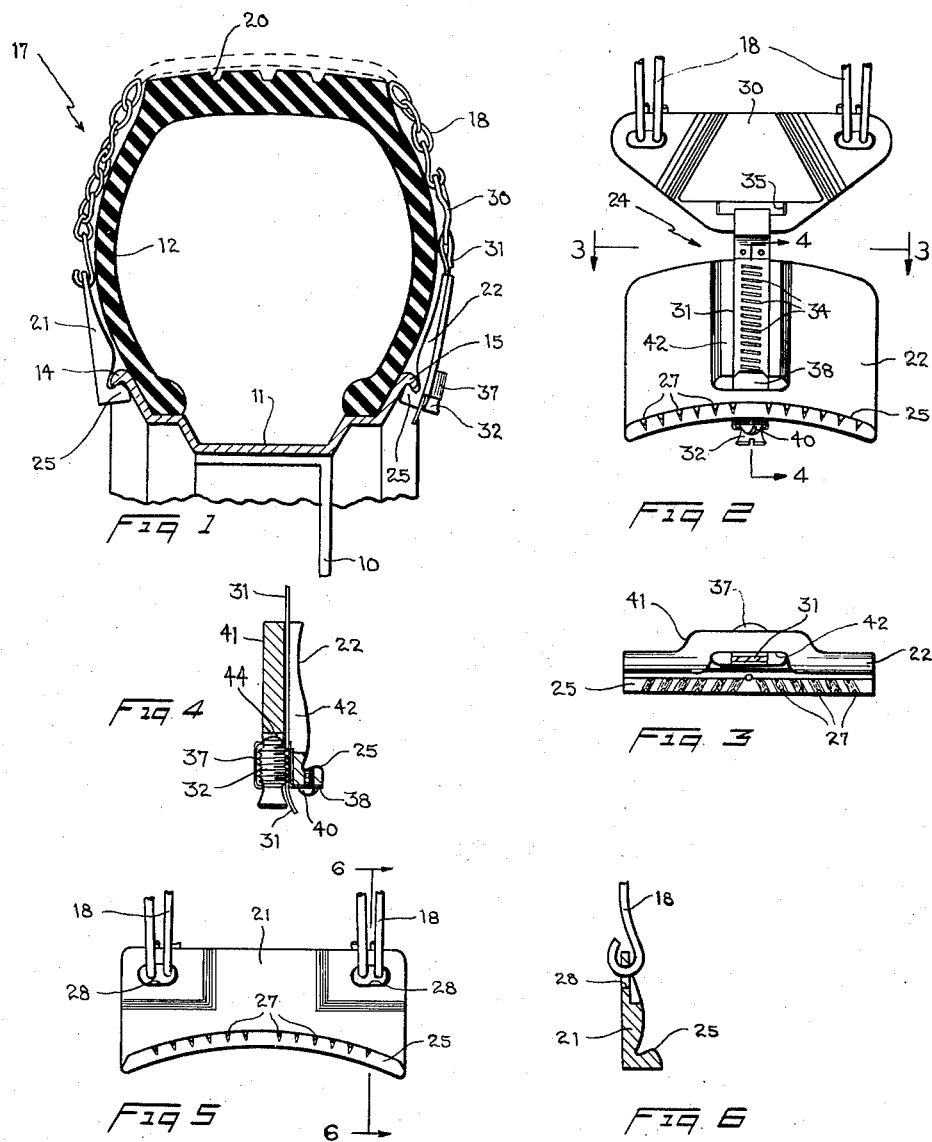
*INVENTOR.*
IRVING BERGER
BY
Richard von K. Bruns
Atty.

United States Patent Office 2,951,522
Patented Sept. 6, 1960

2,951,522

TRACTION DEVICE FOR VEHICLE WHEELS

Irving Berger, 25 Ely Drive, Fayetteville, N.Y.

Filed Mar. 25, 1958, Ser. No. 723,913

4 Claims. (Cl. 152—236)

This invention relates generally to accessories for automotive vehicles, and has particular reference to an improved anti-skid or traction increasing device for vehicle wheels.

Over a period of years, the so-called "full" or standard type of tire chains which extend about the entire circumference of the tire have been decreasing in popularity because of the nuisance and difficulty in applying them, particularly on modern vehicles of streamlined design where the wheels are relatively inaccessible. For a time, the rigors of applying a set of full chains could be avoided by using quickly connectable emergency or strap-on chains which usually consisted of a pair of cross chains held in place by a strap that was passed through an opening in the vehicle wheel. In the last few years, however, even strap-on chains have become almost obsolete since most automobile wheels are now of the solid disc type having no convenient openings through which a strap or the like can be passed.

Because of the aforementioned difficulties caused by the chains themselves and by changes in vehicle design, various other traction devices have been proposed which eliminate the use of a fastening means that passes through the vehicle wheel and at the same time are intended to be easier to put on than full chains. The great majority of these, however, employ some kind of clamping member which must be inserted between the tire casing and wheel rim, and such arrangements have proved generally unsatisfactory particularly with tubeless tires where a tight seal with the rim is essential. Other devices require a permanent fixture on the rim to which the chains can be attached, and still others are in the form of clamps or cleats that grip the tire itself, but none of these arrangements have been very practical or met with any widespread acceptance.

Accordingly, with the foregoing and other considerations in view, the present invention contemplates and has as its primary object the provision of a traction increasing device for vehicle wheels which can be quickly attached to the wheel rim without the use of special attachment fixtures and without in any way interfering with the proper engagement of the tire casing with the rim.

Another important object of the invention is to provide a traction device of the character described which can be rigidly secured in position on the vehicle wheel by means of a single and easily accessible adjustment mechanism.

A further important object of the invention is to provide a traction device of the character described which is exceedingly simple to apply to and remove from the vehicle wheel without the use of special tools of any kind.

Still another important object of the invention is to provide a traction device of the character described which is strong and durable and yet is of a relatively simple, inexpensive construction.

Other objects and advantages of the invention will become apparent from the following detailed description thereof read in conjunction with the accompanying drawings which illustrate a representative embodiment of the invention for the purpose of disclosure.

In the drawings:

Figure 1 is a transverse section through a vehicle wheel showing a traction device embodying the invention in operable position on the wheel;

Figure 2 is a side elevation of the inner side of one of the rim-gripping members of the traction device showing the adjustable linkage means for tightening the device on the wheel;

Fig. 3 is a horizontal section taken substantially along line 3—3 of Figure 2;

Figure 4 is a vertical section taken substantially along line 4—4 of Figure 2;

Figure 5 is a side elevation of the inner side of the other rim gripping member of the traction device; and Figure 6 is a vertical section taken substantially along line 6—6 of Figure 5.

Having reference now to the drawings, wherein like reference numbers designate the same part in each of the views, 10 indicates a disc type vehicle wheel of substantially conventional modern construction, the inside of the wheel being on the left as seen in Figure 1. Wheel 10 includes a rim 11 on which a tire casing 12 is mounted in the usual manner, and the rim is formed with inner and outer outwardly turned peripheral flanges 14, 15 to which the traction device of the invention is adapted to be attached without the use of additional fittings as will be described below.

The traction device, which is generally indicated at 17, is essentially comprised of a pair of chains 18 adapted to extend traversely across the crown or tread 20 of the tire and a pair of rim gripping members 21, 22 connected to the opposite ends of the chains, the outer gripping member 22 being connected to the chain ends through an adjustable linkage shown at 24. The rim gripping members 21, 22 are preferably formed by casting, and each is provided on its inner side with an arcuate lip 25 adapted to engage with the inner and outer peripheral rim flanges 14, 15, the curvature of the lips substantially conforming to the flange curvature of the standard sizes of vehicle wheels. In order to increase the holding power of the rim gripping members and prevent them from slipping relative to the rim, shallow grooves 27 may be formed in the surfaces of the lips 25 or the latter can be otherwise roughened as by knurling or sand blasting.

The cross chains 18, or other suitable traction increasing cross members, are connected directly to the inner rim gripping member 21 as by passing the end links of the chains through apertures 28 in the member and bending them back upon themselves, as shown. The opposite ends of the chains are connected in the same manner to a hanger link or yoke element 30 which is in turn connected to the outer rim gripping member 22, by the adjustable linkage 24.

The adjustable linkage 24 preferably comprises an elongated strap 31 and a screw 32 the threads of which engage in obliquely disposed slots 34 in the strap. Turning the screw thus operates to move the strap longitudinally in substantially the same manner as a rack is moved by a pinion. The strap is secured to the yoke element 30 as by passing one end thereof through an opening 35 in the yoke and bending the end back upon itself to form a closed loop which makes a relatively loose connection. The screw 32 is mounted in a housing 37 which includes a flange 38 that is fastened to the member 22 as by a machine screw 40. The housing 37 is slotted at its ends to permit the strap to pass therethrough and engage with the screw threads as shown in Figure 4.

As may be seen from Figures 2-4, the upper central portion of the outer rim gripping member 22 is outwardly offset as at 41 thereby forming a centrally disposed longitudinal channel 42 on the inner side of the member. The offset portion terminates at a point 44 spaced above the bottom of the rim gripping members, see Figure 4, and is open at the lower end so that the strap 31 can be positioned in the channel 42 and pass through the lower end thereof for engagement with the screw 32, the screw housing being mounted below the offset portion in alignment with the channel as shown in Figure 3. With this arrangement, the screw 32 is positioned on the outer side of the rim gripping members where it is easily accessible when mounting the traction device on the vehicle wheel and, at the same time, the strap is positioned on the inside of the member so that the force exerted thereby on the member is close to the lip 25, see Figure 4, and helps to hold the latter in tight engagement with the peripheral rim flange 15.

In applying the traction device to the vehicle wheel, the inner rim gripping member is first engaged with the inner rim flange 14 and then the cross chains 18 are positioned over the tire tread and the outer rim gripping member is engaged with the outer rim flange 15. The screw 32, which has a slotted head as shown in Figure 2, is then turned by means of a screw driver or a coin to adjust the linkage 24 and tighten the device on the wheel, the strip being moved longitudinally relative to the gripping members 22 during the tightening to decrease the spacing between the yoke element 30 and the member. As a practical matter, best results are obtained by applying from two to four of the traction devices on each rear wheel, and it is easiest to apply them to the lower portion of the wheel between the ground and fender and then move the vehicle enough to rotate the wheels approximately 90° whereby additional devices can be applied if needed.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a traction device for a vehicle wheel including a tire receiving rim having inner and outer outwardly turned peripheral flanges at opposite sides thereof, a plurality of cross chains extending transversely across the tread of a tire mounted on said rim, a first rim gripping member having an arcuate lip directly engaging the inner peripheral rim flange, the curvature of said arcuate lip substantially conforming to the circumferential curvature of said peripheral rim flanges, one end of each of said cross chains being secured to said first rim gripping member, a yoke element secured to the opposite ends of each of said cross chains, a second rim gripping member normally spaced from said yoke element, said second rim gripping member having an arcuate lip directly engaging the outer peripheral rim flange, the curvature of said arcuate lip substantialy conforming to the circumferential curvature of said peripheral rim flanges, and an adjustable linkage mechanism connecting said yoke element and second rim gripping member, said linkage mechanism comprising a metal strap loosely connected to said yoke element and means on said second rim gripping member engaging said strap and operable to move it relative to the rim gripping member to vary the spacing between the latter and the yoke element, said spacing being decreased to tighten the traction device on the vehicle wheel and tire when said first and second rim gripping members are engaged with said peripheral flanges.

2. In a traction device for a substantially imperforate vehicle wheel including a tire receiving rim having inner and outer outwardly turned peripheral flanges at opposite sides thereof, a pair of cross chains extending transversely across the tread of a tire mounted on said rim, a first rim gripping member having an arcuate lip on its inner side directly engaging the inner peripheral rim flange, the curvature of said arcuate lip substantially conforming to the circumferential curvature of said peripheral rim flanges, one end of each of said cross chains being secured to said first rim gripping member, a yoke plate secured to the opposite ends of each of said cross chains, a second rim gripping member having an arcuate lip on its inner side directly engaging the outer peripheral rim flange, the curvature of said arcuate lip substantially conforming to the circumferential curvature of said peripheral rim flanges, and an adjustable linkage mechanism normally connecting said yoke plate and second rim gripping member together in spaced relation to one another, said linkage mechanism comprising an elongated connector band attached at one end to said yoke element and a rotatable element mounted on said second rim gripping member in operable engagement with the connector band, actuation of said rotatable element effecting longitudinal movement of said connector band thereby moving said yoke element towards or away from said second rim gripping member, movement of said yoke element towards said second rim gripping member being operable to tighten the traction device on the vehicle wheel when said first and second rim gripping members are engaged with said peripheral rim flanges.

3. Structure as defined in claim 2 wherein said first and second rim gripping members are adapted to be positioned close to the side walls of a tire mounted on said rim, said second rim gripping member being formed on its inner side with a centrally disposed longitudinal channel in which said elongated connector band is positioned whereby the force exerted by the band on the rim gripping member when the traction device is tightened on the wheel holds the gripping member in close engagement with the outer peripheral rim flange.

4. Structure as defined in claim 2 wherein said rotatable element is a screw mounted on the outer side of said second rim gripping member opposite the arcuate lip thereof whereby said screw is easily accessible for tightening the traction device on the vehicle wheel.

References Cited in the file of this patent

UNITED STATES PATENTS

| | | |
|---|---|---|
| 2,308,904 | Wood | Jan. 19, 1943 |
| 2,647,551 | Richards | Aug. 4, 1953 |
| 2,664,133 | Eger | Dec. 29, 1953 |
| 2,695,648 | Das | Nov. 30, 1954 |
| 2,840,132 | Palmer et al. | June 24, 1958 |